Oct. 4, 1955  H. F. SCHULZ  2,719,591
ROTATING BLADE AIRCRAFT
Filed June 5, 1951  4 Sheets-Sheet 1
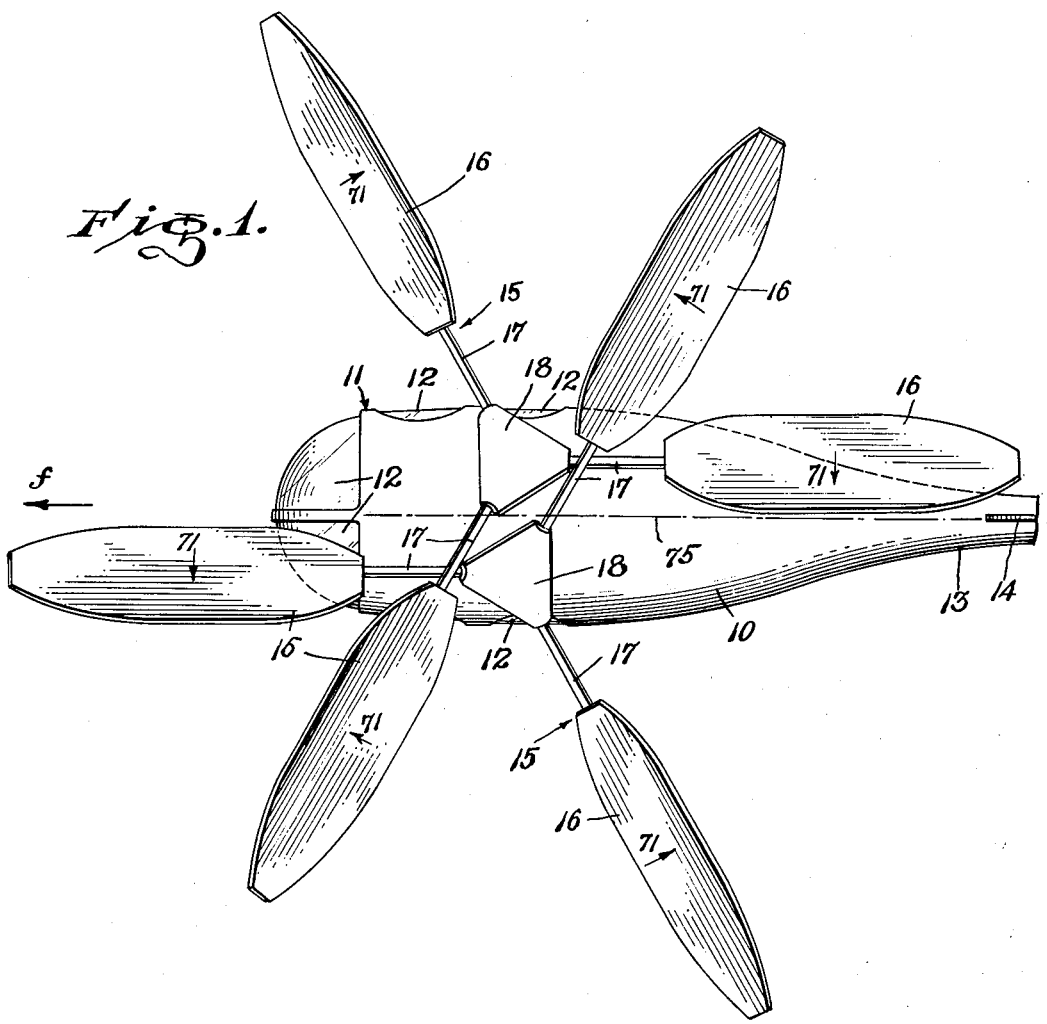
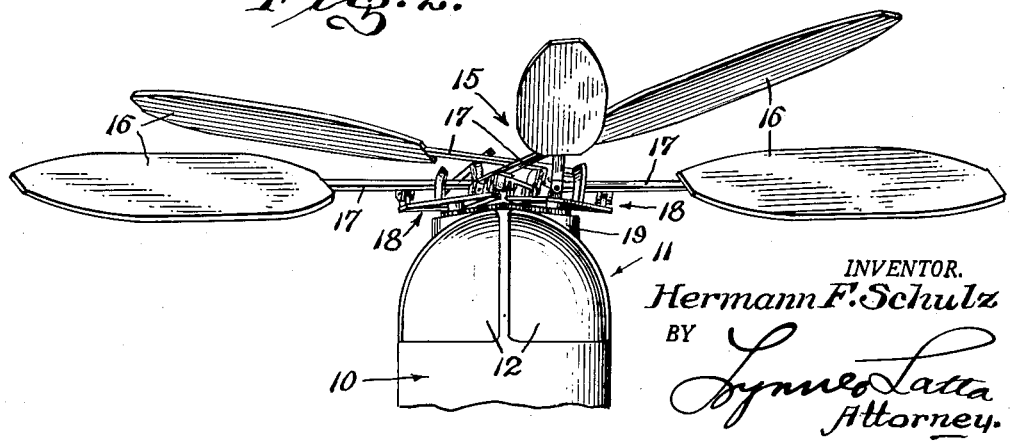
INVENTOR.
Hermann F. Schulz
BY Lynne Latta
Attorney.

Oct. 4, 1955 H. F. SCHULZ 2,719,591
ROTATING BLADE AIRCRAFT
Filed June 5, 1951 4 Sheets-Sheet 2
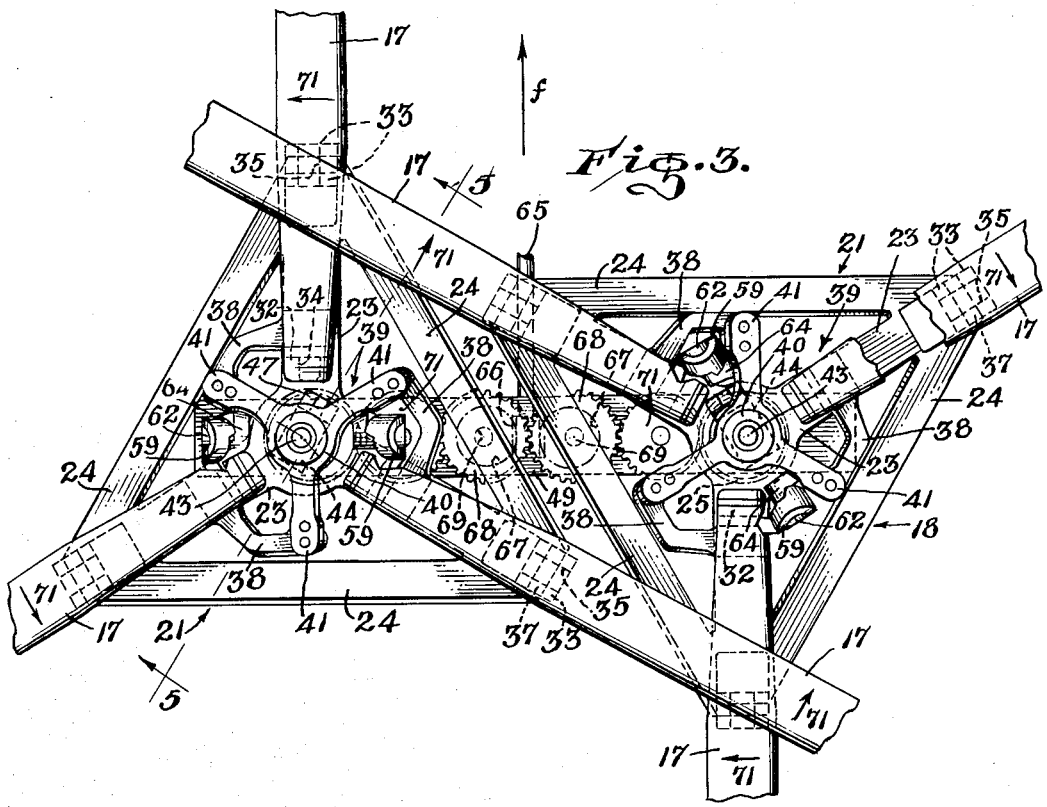
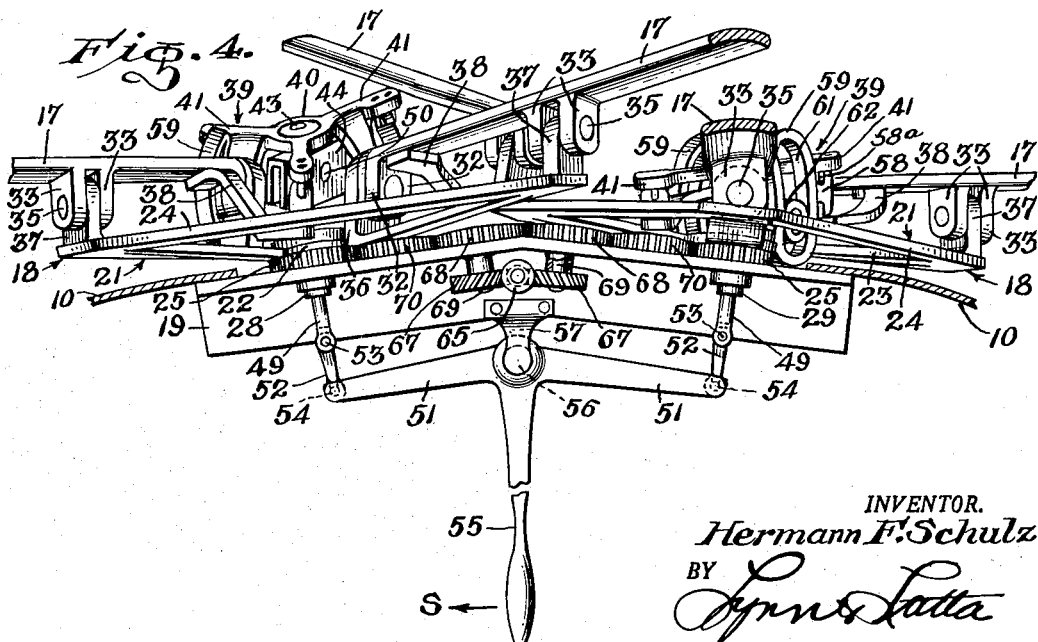
INVENTOR.
Hermann F. Schulz
BY Lynn Latta
Attorney.

Oct. 4, 1955    H. F. SCHULZ    2,719,591
ROTATING BLADE AIRCRAFT
Filed June 5, 1951    4 Sheets-Sheet 3
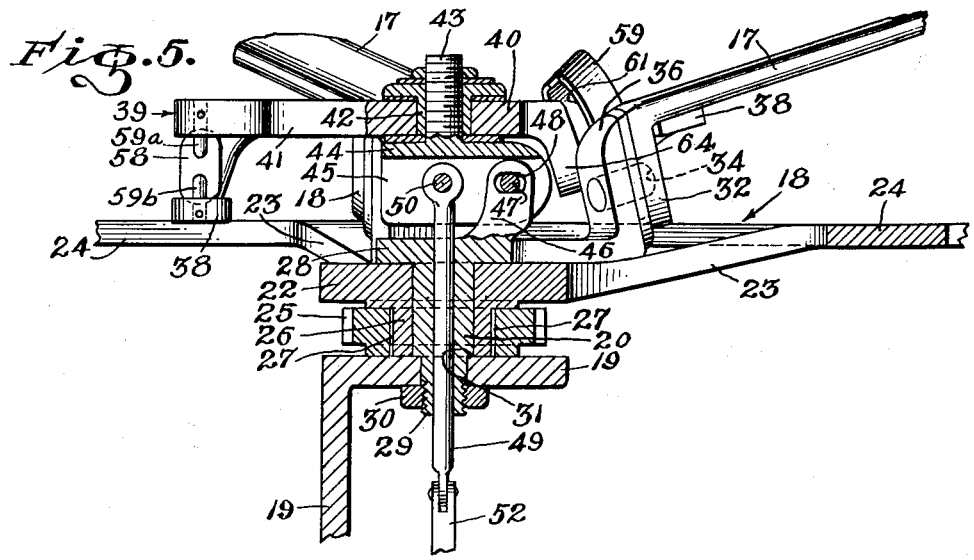
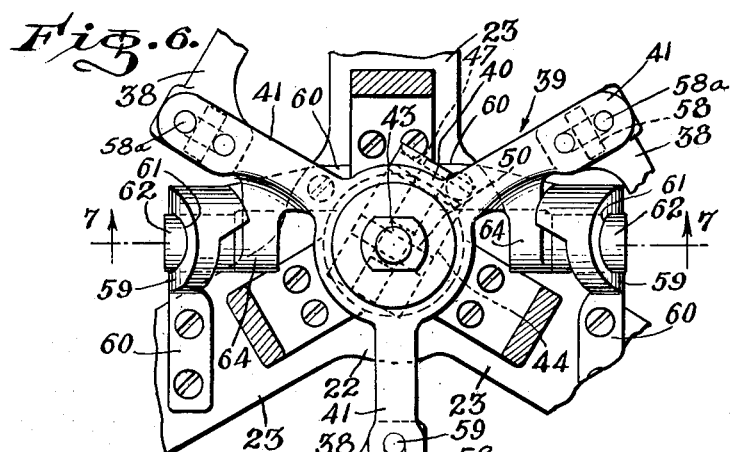
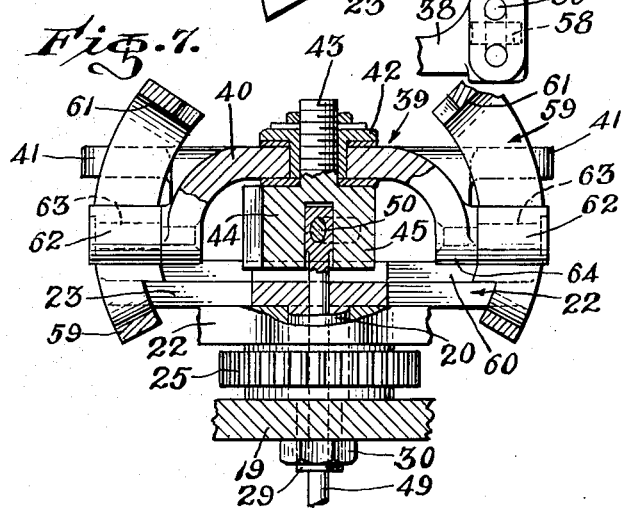
INVENTOR.
Hermann F. Schulz
BY
Attorney.

INVENTOR.
Hermann F. Schulz
BY Lynn Latta
— ATTORNEY —

United States Patent Office 2,719,591
Patented Oct. 4, 1955

2,719,591

ROTATING BLADE AIRCRAFT

Hermann F. Schulz, Los Angeles, Calif.

Application June 5, 1951, Serial No. 229,989

11 Claims. (Cl. 170—135.22)

This invention relates to gyroplanes and is especially directed to a rotating blade ornithopter having dual, laterally opposed rotors, similar to a helicopter. In contrast to the more conventional types of helicopters, however, the present invention contemplates a gyroplane partaking of the characteristics of both helicopter and ornithopter. This is attained by a combination of features including (a) a very substantial lateral inclination of the axes of both rotors with reference to the vertical, median, fore-aft plane of the craft, and (b) the utilization of cyclic blade pitch change of a nonsymmetrical character for effecting forward propulsion of a "paddling" type, with the blades at maximum pitch (paddling positions) having not only rearward, but also downward movement, such as to exert lift in a manner analogous to the lifting action of downwardly flapping wings. The invention relates specifically to a helicopter wherein the rotor hubs are arranged quite closely together, with the rotor blades in intermeshing relation. While others have previously proposed helicopters having this general arrangement, such proposals, insofar as I am aware, have been limited to helicopters having hinged, vertically flapping blades, with no means for changing the pitch of the blades for maneuvering purposes.

Another object is to provide, in a helicopter of the type under consideration, mechanism for cyclically changing the pitch of the respective rotor blades, in a manner to: (a) achieve the hovering to forward flight control by identical cyclic pitch changes (simultaneous cyclic changes of like character and degree in both rotors) and (b) to effect steering by differential cyclic pitch changes (changes which are in opposite directions in the respective rotors), and (c) to effect an asymmetrical cyclic pitch feathering of the blades.

A further object is to provide a helicopter of the type under consideration, which relies completely upon cyclic pitch change of the rotor blades for controlling and maneuvering the helicopter, and does not require the hinging of the blades of the rotors to their respective hubs, for vertical flapping movements. Accordingly, the invention is directed toward the attainment, in a helicopter having the arrangement of twin, side by side rotors on upwardly diverging axes, with their hubs closely associated, of maneuvering through pivotal movements of the blades about relatively simple, pivotal connections of the blades to the hubs on axes extending longitudinally of the blades.

Other objects will become apparent in the ensuing specifications and appended drawings in which:

Fig. 1 is a plan view of a helicopter embodying the invention;

Fig. 2 is a front view of the same;

Fig. 3 is a plan view of the hub portions of the helicopter rotors, in detail;

Fig. 4 is a rear perspective view of the same;

Fig. 5 is a detailed sectional view of one of the rotor hub assemblies taken on the line 5—5 of Fig. 3;

Fig. 6 is a fragmentary plan view of the hub mechanism shown in Fig. 5;

Fig. 7 is an axial sectional view taken on the line 7—7 of Fig. 6;

Figure 8:
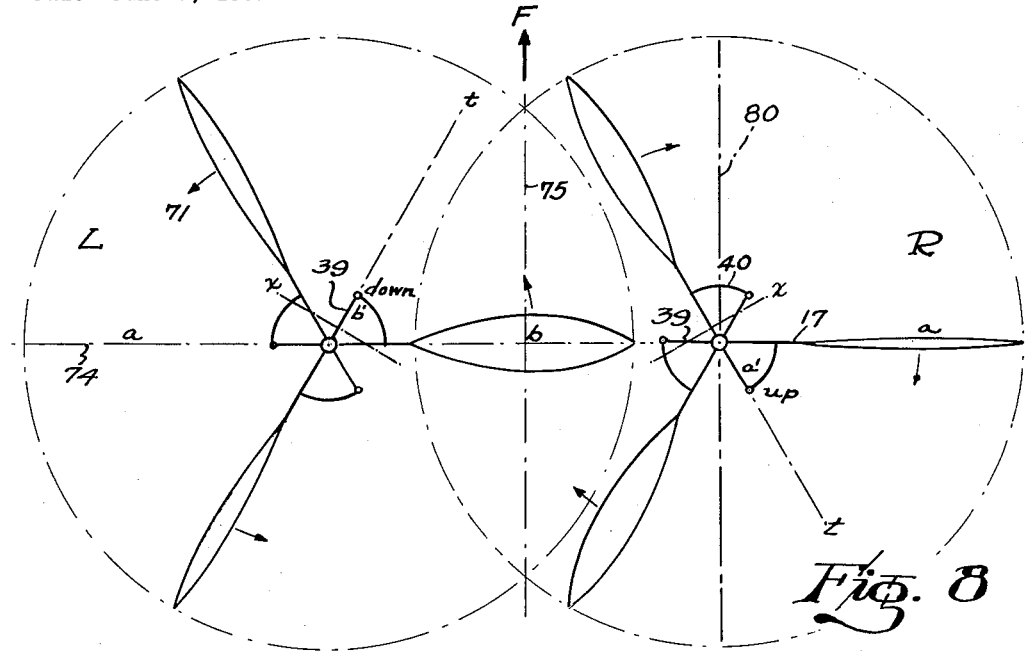
Fig. 8 is a schematic illustration of forward flight operation of the helicopter.

Referring now to the drawings in detail, and in particular to Figs. 1 and 2, I have shown as an example of one form in which the invention may be embodied, a helicopter embodying a fuselage 10 having a cockpit portion 11 provided with suitable windows 12 for the pilot's compartment and having a tail portion 13 including a vertical stabilizer 14 disposed in the median longitudinal plane of the fuselage indicated by center line 75. Forward direction is indicated by arrow $f$ in Figs. 1 and 3.

The twin rotors 15 each include blades 16 having shanks 17 by which they are pivotally connected to hubs 18 for feathering movements on axes generally parallel to shanks 17. Hubs 18 are preferably of triangular shape as illustrated, in order that they may counter-rotate without interference with each other, and at the same time provide maximum support for blades 16. Rotors are symmetrically disposed on respective sides of median plane 75, on upwardly diverging axes. The upward divergence makes it possible to attain a closer intermeshing of the two rotors, without interference, than would otherwise be possible. It also adds flight stability.

Suitably supported in the upper portion of the fuselage 10 (Figs. 3 to 7) is a span member 19 in the ends of which are mounted respective rotor axles 20. Hubs 18 embody frame members in the form of spiders 21 each of which may comprise a central hub section 22 journalled upon a respective axle 20, a plurality of radial arms 23 united with hub section 22, and circumferential braces 24 tying the ends of the arms 23 together. Drivingly connected to hub section 22 is a spur gear 25, through which a drive is transmitted to the respective spider 21. Gear 25 may be keyed or secured to hub section 22 in any suitable manner, as, for example, by means of a reduced collar portion 26 on hub section 22, having external splines 27 splined into gear 25. Gear 25 is confined between spider 21 and span member 19, and is held in assembly by means of an axle 20 which may, for this purpose, have a head portion 28 engaging hub section 22, and a reduced threaded shank 29 extending through span member 19 and secured by a nut 30, with a shoulder 31, defined between the reduced portion 29 and the body of axle 20, clamped against span member 19 to provide proper clearance between said span member and head 28 for free rotation of spider 21 and hub 18 therefor about a drive axis extending axially of the hub section 22 as, for example, about an axis longitudinally defined by the axle 20 normal to the plane of rotation of hub 18.

While it is possible to embody the invention in a two bladed rotor, I prefer to utilize three bladed construction. Accordingly, there are three of the arms 23, spaced 120° apart. Each of these arms provide a support for a respective blade shank 17. Pivotal connection of blade shank 17 to arms 23 is provided by an end ear 32 and a pair of ears 33 spaced tipward from end ear 32 on each shank 17, ears 32, 33 being respectively pivoted, by pivots 34, 35 respectively, to brackets 36, 37 projecting upwardly from spider arms 23. Pivots 34, 35 are aligned on the desired feathering axis. It will now be apparent that the blades are mounted in their respective hubs on fixed feathering axes, with no provision for flapping.

Feathering movements are transmitted to the respective blades through crank arms 38, each rigidly attached to a respective shank 17 and projecting therefrom in a generally circumferential direction with reference to the rotor axis of the hub 18 or axle 20. Arms 38 may extend clockwise or counterclockwise as preferred but in either event they all extend in the same circumferential direction. Control movements are transmitted to arms 38 from control spiders 39 (for the respective rotors 15), each of three-arm star shape, and including a hub section 40 and three equally spaced arms 41 projecting therefrom (Figs. 5 and 6). Hub 40 of each control spider is rotatably mounted on a bushing 42 which in turn is mounted on a stud 43 carried by an adjustable saddle 44. Saddle 44, of channel section, having parallel side portions 45, is tiltably mounted upon a respective axle 20 by means of an ear 46, integral with head 28 and projecting upwardly and snugly embraced between side members 45. A fulcrum pin 47, mounted in and bridging between side members 45, extends through a horizontally elongated slot 48 in ear 46 to provide a pivotal connection between saddle 44 and post 20.

Referring to Fig. 5, the stud 43 constitutes the axis of rotation of the spider 39 and is illustrated in an assumed position in axial alignment with the axle 20 and the drive axis of the hub 18 therefor. In such assumed position, the plane of rotation of the spider 39 is parallel to the plane of rotation of the hub 18 and the spider is in a neutral axial position with respect to the rotational axis of the hub 18. Tilting movement of the mounting saddle 44 of the spider 39 in either direction away from the neutral position, as about the fulcrum 47, however, renders the above-mentioned planes of rotation nonparallel, the axis of rotation of the spider being angularly displaced of the drive axis of the hub 18. The hub drive axis and the spider rotational axis, however, maintain an intersecting relationship as, for example, at a point defined by pivot pins 50 which will hereinafter be referred to. The pins 50, as will hereinafter be understood, define a single axis extending normal to the intersection of the spider rotational axis and the hub drive axis. In the neutral position of the spider 39, as illustrated in Fig. 5, the rotation of the spider is concentric with respect to the rotation of the hub 18 and the axis of the axle 20 therefor. However, upon tilting movement of the saddle 44 and the resulting angular displacement of the axis of rotation of the spider 39, the center of rotation of the spider is eccentrically displaced or offset from the hub axis. Accordingly, the control spider 39 may assume various angular and eccentric positions on either side of the neutral axial position, the amount of eccentricity being a function of the angle assumed.

It will now be apparent that control spiders 39 are mounted for tilting or hinging movement about fulcrum axes which are fixed with relation to axles 20, whereby each bearing stud 43, defining the axis of rotation of a respective control spider 39, may be tilted in a single fixed plane of the axis of the respective axle 20. While it is possible, by the construction shown, to rotatably adjust this plane of tilting movement around the axis of axle 20, the preferred arrangement of the invention is one in which the planes of tilting movement of bearing studs 43 are disposed in converging relation, each at an angle of approximately 60° to the common plane 74 of axles 20 (a transverse plane substantially at right angles to the longitudinal axis of the helicopter at the rotor axes). The reason for this arrangement will become apparent hereinafter.

Saddles 44 are tilted by means of control rods 49 extending axially through axles 20, which are tubular, the upper ends of control rods 49 extending between side members 45 of the saddles 44 and being pivoted thereto by pivot pins 50. The invention employs any suitable means for moving the rods 49, (a) in unison with each other for identical cyclic pitch changes, or (b) in opposition (one rod moving upwardly while the other moves downwardly) for differential cyclic pitch change. Merely by way of example of a suitable means to this end, I have shown, in Figs. 4 and 10, a common control device in the form of a double bell-crank lever (T-shaped) including lever arms 51 extending laterally in opposite directions from a common fulcrum pivot 56, connected to rods 49 through connecting links 52 and pivots 53, 54, and including an integral operating lever 55 which is adapted to be manipulated either to shift both lever arms 51 in the same direction or to rock them about the fulcrum pivot 56 by means of which the operating member is pivotally connected to a suitable fulcrum bracket 57. To shift both arms 51 in the same direction, fore-aft movement is transmitted to lever 55. Vertical movement of the outer ends of both arms 51 in the same direction results from the fact that fulcrum pivot 56 is located considerably forwardly of the transverse plane of operating rods 49, and the arms 51 are inclined rearwardly from pivot 56. Pivot 56 is in the form of a gimbal joint or universal pivot which permits the lever 55 to be swung in any desired direction either laterally or fore and aft. Pivots 54 may likewise be universal pivots.

The arrangement is preferably such that to induce forward flight, the operator moves lever 55 forwardly and to induce left or right turning, the operator moves lever 55 to the left or to the right, respectively, as will be explained hereinafter in the description of operation. These are the natural movements for such control operations.

Control movements, transmitted through operating rods 49 to control spiders 39, will effect the tilting of the spiders 39 either in unison or in opposition or with an aggregate of both such movements. The tilting movements of the control spiders 39 are in turn transmitted to the helicopter blades through articulated connecting means such as links 58 connected by pivots 58a and 58b respectively to the spider arms 41 and to the crank arms 38 of the rotor blades. Thus the tilting movements of the spiders are transmitted to the rotor blades by a linkage of interengaging means, to feather the blades about their feathering axes defined by pivots 34, 35.

The control spiders 39 are caused to rotate with the rotor hubs 22, by driving or torque connections including, for each rotor, a pair of driving yokes 59 rigidly mounted upon hub spider arms 23 as by means of mounting brackets 60 integral with yokes 59 (Fig. 6), and arranged in diametrically opposed relation in a common plane intersecting the axis of a respective axle 20 in positions clearing adjacent arms of spiders 39. Yokes 59 are of circular arc form, disposed upon a circumference of a center substantially coincident with the point of intersection of the drive axis of the hub 22 and the rotational axis of the spider 39, for example, as defined by the intersection of the axis of the pins 50 and either of the spider or hub axes above mentioned as illustrated by the position of the elements in Fig. 5. The yokes 59 are provided with elongated slots 61 disposed in the aforesaid axial plane of axle 20. Received in slots 61 are a pair of rollers 62 which are journalled on trunnions 63 carried at the ends of arms 64 integral with a respective control spider 39. It will now be apparent that rollers 62 may swing arcuately in slots 61 to allow tilting movement of spider 39 about an axis normal to the plane of slots 61, and may pivot in slots 61 in order to allow tilting movement about an axis lying within said plane. The combination of these tilting movements provides for universal tilting movement of the spider 39 with reference to the hub spider 21, while maintaining a driving connection between them which permits no circumferential shift of one spider relative to the other.

Drive is transmitted to the respective rotors from a drive shaft 65 and a drive worm 66 to a pair of worm gears 67 each driving a respective spur gear 68 through a shaft 69 journalled in span member 19. Idler gears 70 may be interposed between gears 68 and gears 25 so that the driving means may be embodied in twin trains of gears of sufficiently small diameter to avoid interference with the hub spiders, and with the gears of each train arranged in line on top of the span member 19.

Operation

It will be apparent that the rotation of worm 66 in a selected direction will counterrotate the respective trains of gears so as to rotate the rotors in opposite direction, e. g. as indicated by arrows 71 in Fig. 1, with the blades at the outer, remote sides of the rotors moving rearwardly and with the overlapping blades at the adjacent sides of the rotors, moving forwardly. This makes it possible, by feathering the overlapping blades on the adjacent sides to minimum pitch, while the remote, outer blades attain maximum pitch, to utilize the maximum pitch of such remote blades for paddling the craft in forward flight.

Various operations are accomplished as follows:

*Hovering.*—For hovering and vertical flight all blades are set at the same angle of incidence. This angle is fixed, and is preselected for optimum performance. It is determined by neutral positions of control spiders 39, for example, the neutral position thereof with respect to the spider 21 or hub 22 therefor as illustrated in Fig. 5, in which they are disposed in planes normal to the respective rotor axes.

*Forward flight.*—Forward flight is illustrated schematically in Fig. 8. In order that the operation may be visualized from the viewpoint of the pilot or other person facing forwardly in the craft, Fig. 8 is arranged with the forward direction at the top, as indicated by arrow F. The centerline 75 indicates the longitudinal median plane of the helicopter. The broken line 74 indicates the common transverse plane of the rotor axes, normal to the median plane 75. The broken lines $x$ indicate the fulcrum pivots 47 which permit tilting movements of control spiders 39, and the broken lines $t$ indicate the substantially vertical planes of tilting movement of spider bearing studs 43, which planes converge forwardly and downwardly. Right and left sides are indicated by R and L respectively. One cycle of rotation of the rotors, for example, the right side rotor designated by the letter R, may be said to pass through inner and outer zones which lie in the plane of rotation of the blades on the left and right sides respectively of a broken line 80 substantially parallel to the line 75 and passing through the axis of rotation of the hub 18.

Forward flight is brought about by causing the respective rotor blades to attain maximum pitch at positions in the outer zone at or near the transverse plane 74 (indicated at $a$) remote from the median longitudinal plane 75, and to attain minimum blade angle in the inner zone at or near their innermost, overlapping positions in transverse plane 74 (indicated at $b$). In the outer zones the blades will exert maximum rearward push against the body of air in which the helicopter is moving, and in the inner zones, in which they are moving forwardly, the blades will be feathered so as to develop minimum drag. Consequently, the counterrotating rotors will effect a paddling movement for propelling the helicopter forwardly but the feathering of the blades in the construction illustrated is not symmetrical but asymmetrical, with respect to each cycle of rotation of the rotor due to the eccentricity of the control spider during forward flight with respect to the neutral position, as will hereinafter be more clearly understood. As each of the rotor blades passes from position $b$ to position $a$, it is feathered about its axis and will attain at some intermediate point an angle of incidence the mean of the maximum and minimum angles. Due to the eccentricity of the control, however, the mean angle is not attained when the blade axis is extending directly forward of the aircraft, but at a blade position in the outer zone intermediate the line 80 and the line 74. In any event, however, as the blades pass from position $b$ to position $a$, they function to provide a lifting action, but as they approach the maximum angle position their rate of change of angle will increase rapidly and the blade action will impart a primarily forward propulsion action. After each blade has attained the maximum angle in the outer zone and as it progresses toward a rearward position, the angle will change rapidly to a mean angle intermediate the maximum and minimum angle at a position in the outer zone between the lines 74 and 80 and thereafter decrease in rate of change as the minimum blade angle is approached, and during this latter period both lift and drag will diminish. Accordingly, the effective zones of forward propulsion operation of the blades are in the outer, or remote halves of their respective paths of rotation, and in the inner, intersecting halves of their respective paths of rotation, in which they move counter to the direction of flight, they will be feathered for reducing to a minimum their drag resistance to the forward flight.

The cyclic feathering of the blades to effect the above described results, is attained by tilting the respective control spiders 39 in unison downwardly, forwardly and inwardly from their neutral positions, to the same angle of inclination for each spider, as, for example, by lifting the rod 49 (see Fig. 5) to cause the saddle 44 to pivot about the fulcrum 47, thereby causing the rotational axis of the spider 39 to tilt or pivot about a single axis defined by a line axial to the pins 50. In Fig. 8, in the right spider, the control arm indicated at $a'$ is disposed in the plane $t$ of tilting movement, and has reached a position of maximum elevation (as indicated by the notation "up") so as to bring the blade controlled thereby, at position $a$, to maximum pitch. In the left spider, the arm at the position $b'$, which likewise lies in the median plane $t$ of tilting movement, has reached a position of maximum depression (as indicated by the notation "down") whereby the blade at $b$ has been feathered to minimum blade angle. The arrangement of a horizontal line in the median planes $t$ at 60° to the common transverse plane of the two rotor axes, corresponds to the 60° angle subtended between each control spider arm 40 and the respective rotor blade actuated thereby.

The neutral position of the spider 39 is illustrated in Fig. 5, and the control arms 40 are disposed symmetrically and radially with respect to the axis of the axle 20. However, upon tilting movement of the control spider as by translation of the control rod 49, the axis of rotation of the spider is angularly displaced with respect to the axis of the hub 22 and the center of rotation of the spider is eccentrically displaced from the axis of the axle 20. During rotation of the spiders 21 and 39, and when the spider 39 is in a tilted position, while the ends of the arms 40 partake of vertical motion with respect to the plane of rotation of the hub 22, the ends of the arms 40 also partake of a lateral component of motion with respect to the plane of rotation of the hub 22. The rotation of the spider 39 therefore is eccentric with respect to the axis of rotation of the spider 21 as defined by the axle 20 and as opposed to concentric rotation were the center of rotation of the spider 39 maintained in such a position so as to intercept the extension of the axis of the axle 20.

Figure 10:
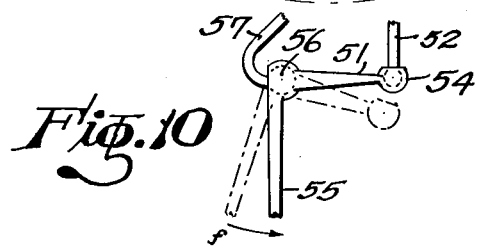
Fig. 10 is a side view of the control lever.

Forward flight is initiated by moving control lever 55 forwardly, as indicated by arrow $f$ in Fig. 10, causing arms 51 to move upwardly in unison. Thus spiders 39 are tilted downwardly and forwardly.

Rearward flight may be achieved by moving lever 55 rearwardly of its neutral, vertical position shown in dotted lines in Fig. 10. Thereupon, spiders 39 will both be tilted from their neutral position opposite to that for forward flight, for example, upwardly and rearwardly, and the blades of both rotors will be feathered to the reverse paddling positions illustrated in the left rotor of Fig. 9, and as a result, the craft will be propelled rearwardly.

Figure 9:
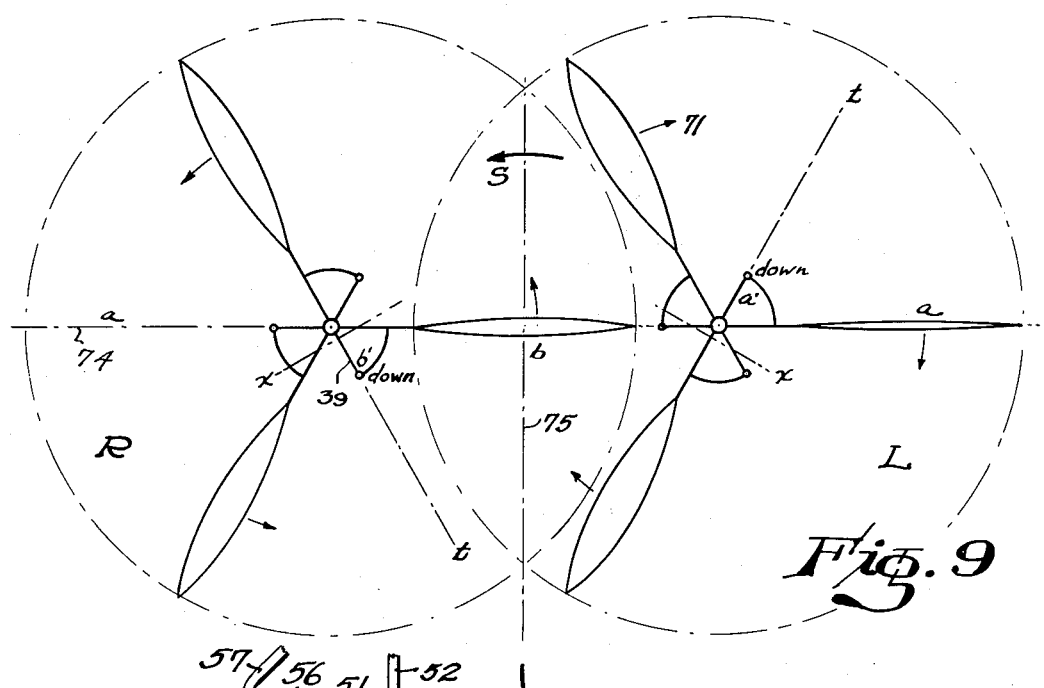
Fig. 9 is a schematic illustration of steering operation of a helicopter; embodying a modified form of the invention.

*Directional control.*—Fig. 9 (which shows a modified arrangement of control linkage) illustrates directional control. Directional control is obtained by tilting the control spiders 39 differentially, i. e. by tilting the axis of rotation of one spider to an angle different from the tilt of the axis of rotation of the other spider. This is accomplished by swinging control lever 55 to one side or the other about pivot 56.

Fig. 9 illustrates the steering operation of making a left turn (counterclockwise as viewed from above and as indicated by arrow S). Assuming first the more simple case in which the helicopter is in hovering flight, with both control spiders 39 in the neutral positions, lever 55 is shifted leftward, with reference to the forwardly facing pilot resulting in the right control spider being tilted forwardly and the left control spider being tilted rearwardly. Accordingly, in the right rotor, at the outer position *a*, the blades will reach a predetermined maximum pitch whereas in the left rotor a predetermined maximum pitch will be reached at the inner position *b*. Further, in the left rotor at the outer position *a*, the blades will be feathered to a predetermined minimum angle. Thus in the right rotor maximum horizontal thrust will be toward the rear whereas in the left rotor it will be exerted in the forward direction, with the following results: (1) the rearward thrust, exerted by the right rotor, will tend to paddle the right side of the helicopter forwardly while the forward thrust exerted by the left rotor, will tend to paddle the left side of the helicopter rearwardly; (2) maximum lift is attained in both rotors at the right side of the helicopter while minimum lift is attained at the left side, and consequently the helicopter will bank toward the left. Both of these factors are left turning effect.

For a right turn, the lever 55 is swung in the opposite direction with similar but opposite effect.

In the more normal operation of making a turn during forward flight, where the two control spiders are already tilted downwardly and forwardly, the lever 55 will be rocked in the desired direction of turn without changing its fore-aft position, whereupon one of the control spiders will be tilted forwardly to a greater degree of inclination while the other is tilted rearwardly to a lesser degree of inclination approaching (or reaching or even passing) the neutral position. In any event, the blade angle in the one rotor at the position *a* will be greater than the blade angle of the other rotor at the position *a*, whereas the blade angle of the one rotor at position *b* will be less than the blade angle of the other rotor at the position *b*. In each case, a turning moment will be developed.

Fig. 9 illustrates how the positions of saddles 45 and crank arms 40 may be rearranged, with the tilt planes *t* diverging forwardly (instead of converging forwardly as in Fig. 8) and with the arms 40 extending from shanks 17 in directions opposite to the directions of rotation of the respective rotors (instead of in the directions of rotation, as in Fig. 8). The operation is the same as in Fig. 8. Forward movement of lever 55 will tilt both spiders downwardly and forwardly, resulting in forward propulsive action of the rotor blades.

From an aerodynamic standpoint, my improved helicopter has a number of important advantages. The forwardly moving intermeshing blades at positions *b*, at minimum angle of incidence, fastened to their hubs on rigid axes, function in a manner analagous to the wings of an airplane. Actually they have an augmented action in this respect since they are moving forwardly faster than the fuselage. Accordingly, these blades develop lift in a manner quite similar to the manner in which lift is developed in the wings of an airplane. On the other hand, the rearwardly moving blades at the extreme outer positions *a*, set at maximum angle of incidence, and connected to their respective hubs on fixed axes, exert forward thrust at maximum speed because they are at maximum distance from the median plane 75 (whereas the blades at positions *b* are at minimum distance from median plane 75). Furthermore, because of the upwardly diverging angle of inclination of the rotor axes, the rearwardly moving blades at positions *a* will move not only rearwardly but downwardly. Thus, in addition to their forward thrust, they will develop components of upward thrust in which they operate in a manner analogous to the wings of an ornithopter.

The overall operation of the craft is therefore, from an aerodynamic standpoint, a composite of that of an airplane, that of a conventional helicopter, and that of an ornithopter.

Considering further the aerodynamic operation of rearwardly moving blades at positions *a*, it will be noted that lift and drag forces acting on these blades are acting in a forward direction i. e. in the direction of flight. (This will become apparent when it is considered that in an airplane wing, moving forwardly, the lift vector is in a direction inclined upwardly and rearwardly and the drag forces of course act in a rearward direction.) The direction of lift and drag forces being in the forward direction in the blades at outer positions *a* (at which positions lift and drag are at a maximum because of the maximum pitch angle of the blades at these positions) it will be apparent that the lift-drag forces act in a direction tending to pull the craft forwardly.

In the helicopter of my invention, forward speed is developed primarily through these forwardly acting high lift-drag forces and the rearward paddling action previously referred to, rather than through the air screw action of a forwardly tilted rotor, which is the conventional method of obtaining forward speed in a helicopter. Much higher forward speeds are obtainable through the action of my helicopter than in the conventional air screw action of a forwardly tilted rotor. This will be apparent when it is considered that forward speed in a conventional forwardly tilted rotor is dependent upon the relation between absolute pitch (the distance between adjacent turns of the helical path of rotation of a blade) whereas in the helicopter of my invention, forward speed is predicated primarily upon the circumferential speed of the outer blades at positions *a*.

I claim:

1. In an aircraft supported by at least two intermeshing rotors, the combination of: a hub for each of said rotors symmetrically disposed on either side of a median plane of said aircraft; a plurality of blades for each of said hubs, each blade extending outwardly of its hub and being pivotally connected thereto for feathering movement about an axis extending substantially parallel to said blade; drive means for counter-rotating said rotors; control means for each of said hubs adapted to be angularly and eccentrically displaced from the axis of rotation of said hub; linkage means operatively connecting the blades of each said rotor to the respective control means; and an actuator for each said rotor for controllably displacing its respective control means for effecting asymmetrical cyclic pitch feathering of said blades during rotation of said rotors.

2. In an aircraft supported by at least two intermeshing rotors, the combination of: a hub for each of said rotors symmetrically disposed on either side of a median plane of said aircraft; a plurality of blades for each of said hubs, each blade extending outwardly of its hub and being pivotally connected thereto for feathering movement about an axis extending substantially parallel to said blade; drive means for counter-rotating said rotors; pitch control means for each of said rotors comprising a control spider and mounting means therefor, said control spider having an axis of rotation adapted for tiltable displacement by said mounting means from a neutral axial position with respect to the rotary axis of said hub and in a plane fixed with respect to said aircraft; interengaging means operatively associating the blades of each said rotor with their respective control spider; and an actuator for each rotor connected to the mounting means of said rotor for effecting displacement of said spider to produce asymmetrical cyclic pitch feathering of said blades during rotation of said rotors.

3. In an aircraft supported by at least two intermeshing rotors, the combination of: a hub for each of said rotors symmetrically disposed on either side of a median plane of said aircraft, each hub defining a drive axis normal to the plane of rotation of said hub; a plurality of blades for each of said hubs, each blade extending outwardly of its hub and being pivotally connected thereto for feathering movement about an axis extending substantially parallel to said blade; drive means for counter-rotating said hubs; control means for each of said rotors comprising a control spider adapted to rotate with its said hub about the rotational axis of said spider, said rotational axis intersecting said drive axis, said spider being mounted for tilting movement on a single axis extending normal to the intersection of said spider rotational axis and said hub drive axis; linkage means operatively connecting the blades of each rotor to the respective control spider; and an actuator for each said rotor, each said actuator connecting with its respective control means and adapted to be translated for tilting movement of said control spider about said single axis to produce asymmetrical cyclic pitch feathering of said blades during rotation of said rotors.

4. In an aircraft supported by at least two intermeshing rotors, the combination of: a hub for each of said rotors, each hub defining a drive axis extending axially of the plane of rotation of said hub; a plurality of blades for each of said hubs, each blade extending outwardly of its hub and being pivotally connected thereto for feathering movement about an axis extending substantially parallel to said blade; drive means for counter-rotating said hubs; pitch control means for each of said rotors comprising a control spider adapted to rotate with its respective rotor hub about the rotational axis of said spider; connecting means intermediate said hub and said spider providing a universal tilting movement of the rotational axis of said spider with respect to said hub; means carried by said hub for rotating said spider; linkage means operatively connecting the blades of each rotor to the respective control spider, said means including for each blade a universal connection intermediate said spider and said blade; and an actuator rod for each said rotor adapted to be translated for reciprocal movement of said connecting means to provide variable asymmetrical cyclic pitch feathering of said blades during rotation of said rotors.

5. In an aircraft supported by at least two intermeshing rotors, the combination of: a hub for each of said rotors symmetrically disposed on either side of a median plane of said aircraft, each hub defining a drive axis normal to the plane of rotation of said hub; an axle for each of said hubs extending longitudinally of said hub drive axes; a plurality of blades for each of said hubs, each blade extending outwardly of its hub and being pivotally connected thereto for feathering movement about an axis extending substantially parallel to said blade; drive means for counter-rotating said hubs; pitch control means for each of said rotors comprising a displaceable control spider adapted to rotate in unison with its respective rotor hub; a torque connection intermediate each said hub and its respective control spider for collective drive rotation thereof; mounting means for each spider adapted for tilting movement on a single axis fixedly normal to said drive axis, said single axis not intersecting the rotational plane of said spider; means carried by each said axle for supporting its respective mounting means; linkage means operatively connecting the blades of each rotor to the respective control spider, said means including for each blade a crank arm and a universal connection intermediate said blade and said spider; and an actuator for each said rotor adapted to be reciprocally displaced for tilting movement of its respective mounting means, whereby rotation of said rotors in combination with a predetermined displacement of said actuators effects an asymmetrical cyclic pitch feathering of said blades.

6. An aircraft as defined in claim 5, in which each said torque connection comprises at least one arcuate yoke carried by its hub and providing an elongate slot; and a projection carried by its corresponding control spider for each said slot and slidably engageable therein, said connection permitting universal tilting movement between said spider and said hub during said collective rotation thereof for any determinate tilting movement of the respective mounting means.

7. In an aircraft supported by at least two intermeshing rotors, the combination of: a hub for each of said rotors disposed on either side of a median plane of said aircraft; an axle for each of said hubs extending along axes upwardly diverging from said plane; a plurality of blades for each of said hubs, each blade extending outwardly and upwardly of its hub and being pivotally connected thereto for feathering movement about an axis extending substantially parallel to said blade; drive means for counter-rotating said hubs; pitch control means for each of said rotors adapted to feather said blades comprising a control spider adapted to rotate in unison with its respective hub; a torque connection intermediate each said hub and its respective control spider for collective drive rotation thereof; a mounting saddle for each said spider on which said spider is mounted for rotation, each saddle being hingedly connected to a fulcrum carried by its respective axle for tilting movement of said saddle in a plane of said axle axis; linkage means operatively connecting the blades of each hub to its respective control spider; and an actuator for each said rotor for pivotal connection to its respective saddle and displaceable for effecting said saddle tilting movement, whereby rotation of said rotors in combination with a predetermined displacement of said actuators effects an asymmetrical cyclic pitch feathering of said blades.

8. In an aircraft as defined in claim 7, in which each said actuator comprises a translatable rod axially disposed of the axle of its said hub; and means operable by a pilot interengaging the actuators of said rotors for imparting simultaneous or differential tilting movement of said saddles for effecting like or different degrees of said cyclic pitch feathering of the blades of the respective hubs.

9. In a helicopter: intermeshing twin rotors disposed in laterally opposed, symmetrical position on respective sides of the median fore-aft plane of the helicopter, each of said rotors comprising a hub and a plurality of blades pivoted to the hub for feathering movement on an axis extending longitudinally of the blade and fixed with respect to both the hub and the blade, said hubs being closer together than the length of the blade so the blades of each respective rotor move over the hub of the other rotor, means to counter-rotate said rotors; each rotor being provided with means to variably change the cyclic pitch of said blades, each such means comprising a member having an axis of rotation and a transverse axis on which said axis of rotation is angularly adjustable, articulated means connecting each respective member and the respective rotor blades, said axis of rotation of each said member being adjustable between a position in alignment with the axis of the respective rotor hub and a position at an angle to the axis of the hub; and actuator means commonly connected to the means for variably changing the cyclic pitch of the blades, said actuator means being provided with a universal pivot and with arms movable, selectively, in the same direction relative to said pivot and in opposite directions, and means connecting said arms to their respective members having the axis of rotation and the transverse axis to adjust said members according to the movement of the actuating means, whereby movement of the arms of the actuating means in the same direction adjusts the mentioned members of both rotors similarly so that changes in pitch of the rotor blades of the two rotors are of like character and degree for corresponding blade positions of the respective rotors, and whereby movement of said arms in opposite directions adjusts the mentioned members of both rotors oppositely so that changes in pitch of the blades of at least one rotor are opposite in character to corresponding blade positions of the other rotor; and the transverse axes of adjustment of each said member being offset relative to the axes of the respective rotors and the axes of rotation of the members, such offset imparting asymmetrical change to the cyclic pitch of the rotor blades.

10. In an aircraft supported by at least two intermeshing rotors, the combination of: a hub for each of said rotors symmetrically disposed on either side of a median plane of said aircraft; a plurality of blades for each of said hubs, each blade extending outwardly of its hub and being pivotally connected thereto for feathering movement about an axis extending substantially parallel to said blade; drive means for counter-rotating said rotors, pitch control means for the blades of each rotor, each said means comprising a member having an axis of rotation and a transverse axis of adjustment of said axis of rotation, articulated means connecting said member and the respective blades, and a controller for adjusting said member on its transverse axis to adjust the angle of the axis of rotation of said member relative to the axis of rotation of the rotor, said transverse axis being offset relative to the axes of rotation of the member and rotor, said offset imparting asymmetrical change to the cyclic pitch of the rotor blades.

11. In an aircraft supported by at least two intermeshing rotors, the combination of: a hub for each of said rotors symmetrically disposed on either side of a median plane of said aircraft; a plurality of blades for each of said hubs, each blade extending outwardly of its hub and being pivotally connected thereto for feathering movement about an axis extending substantially parallel to said blade; drive means for counter-rotating said rotors; and eccentric pitch control means for the blades of each rotor, each said means comprising a member having an axis of rotation and a transverse axis of adjustment of said axis of rotation, articulated means connecting said member and the respective blades, and a controller for adjusting said member on its transverse axis to adjust the angle of the axis of rotation of said member relative to the axis of rotation of the rotor, said transverse axis being offset relative to the axes of rotation of the member and rotor, such offset imparting asymmetrical change to the cyclic pitch of the rotor blades.

References Cited in the file of this patent

UNITED STATES PATENTS

| | | |
|---|---|---|
| 2,437,165 | Locke | Mar. 2, 1948 |
| 2,441,920 | Platt | May 18, 1948 |
| 2,445,354 | Hoppes | July 20, 1948 |
| 2,476,516 | Thompson | July 19, 1949 |
| 2,493,042 | Stalker | Jan. 3, 1950 |
| 2,552,008 | Laskowitz | May 8, 1951 |
| 2,555,577 | Daland | June 5, 1951 |

FOREIGN PATENTS

| | | |
|---|---|---|
| 616,227 | Great Britain | Jan. 18, 1949 |
| 936,056 | France | Feb. 16, 1948 |